United States Patent [19]

Yanagisawa et al.

[11] Patent Number: 5,001,174
[45] Date of Patent: Mar. 19, 1991

[54] EPOXY RESIN COMPOSITION FOR SEMICONDUCTOR SEALING EMPLOYING TRIPHENYLMETHANE BASED NOVOLAC EPOXY RESIN

[75] Inventors: Kenichi Yanagisawa; Naoki Mogi; Hironori Ohsuga; Hiroshi Shimawaki, all of Utsunomiya, Japan

[73] Assignee: Sumitomo Bakelite Company Limited, Tokyo, Japan

[21] Appl. No.: 444,919

[22] Filed: Dec. 4, 1989

[30] Foreign Application Priority Data

| Dec. 8, 1988 [JP] | Japan | 63-308769 |
| Dec. 27, 1988 [JP] | Japan | 63-327630 |
| Dec. 28, 1988 [JP] | Japan | 63-328860 |
| Feb. 21, 1989 [JP] | Japan | 1-39391 |
| Feb. 21, 1989 [JP] | Japan | 1-39392 |

[51] Int. Cl.$^5$ .................................. C08G 59/32
[52] U.S. Cl. ................... 523/443; 523/466; 525/481; 525/482; 525/484; 525/485; 525/486; 525/488; 525/504; 525/507
[58] Field of Search ............... 525/481, 482, 484, 485, 525/486, 504, 507; 523/443, 466

[56] References Cited

U.S. PATENT DOCUMENTS

| 4,390,664 | 1/1983 | Kanayama | 525/482 |
| 4,615,741 | 10/1986 | Kobayashi et al. | 523/443 |
| 4,701,479 | 10/1987 | Shiobara et al. | 523/443 |
| 4,720,515 | 1/1988 | Iji et al. | 525/476 |

FOREIGN PATENT DOCUMENTS 1265847 11/1986 Japan .
3148664 6/1988 Japan .

*Primary Examiner*—Earl Nielsen
*Assistant Examiner*—Frederick Krass
*Attorney, Agent, or Firm*—Browdy and Neimark

[57] ABSTRACT

An epoxy resin composition for semiconductor sealing which comprises, as essential components, (A) an epoxy resin comprising 50-100% by weight, based on total epoxy resin amount, of a polyfunctional epoxy resin represented by the formula (I)

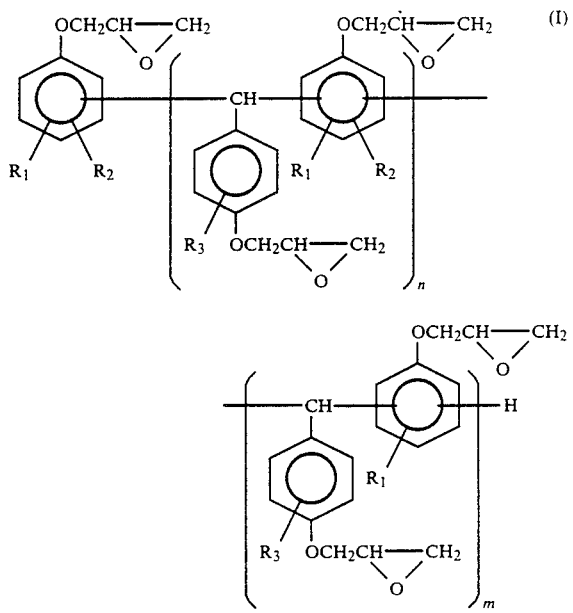

wherein n and m are each an integer of 0 or more, $n+m = 1-10$, and $R_1$, $R_2$ and $R_3$ which may be the same or different, are each selected from hydrogen atom, an alkyl group and a halogen atom, with the proviso that all of $R_1$, $R_2$ and $R_3$ must not be hydrogen atom simultaneously, (B) a phenolic resin curing agent,
(C) a silica filler, and
(D) a curing accelerator.

6 Claims, No Drawings

EPOXY RESIN COMPOSITION FOR SEMICONDUCTOR SEALING EMPLOYING TRIPHENYLMETHANE BASED NOVOLAC EPOXY RESIN

The present invention relates to an epoxy resin composition for semiconductor sealing which has excellent resistance to soldering stress.

In recent years, development in semiconductor-related technologies has been directed from lightness, thinness and smallness to higher component mounting density. Accordingly, memory integration is becoming larger and mounting method is shifting from through-hole mounting to surface mounting. In this connection, packages are changing from conventional DIP (Dual Inline Package) type packages to small and thin packages enabling surface mounting, i.e., flat package, SOP (Small Outline Package), SOJ (Small Outline with J-leads) and PLCC (Plastic Leaded Chip Carrier). However, the latter packages, being small and thin, have problems such as occurrence of cracks due to stress and reduction in moisture resistance due to the cracks.

In the packages for surface mounting, attention is paid particularly to a problem that the packages undergo a quick temperature change at the time of soldering of leads thereto for surface mounting and resultantly generate cracks.

In order to solve the problem, there were made various attempts to reduce the thermal shock imparted at the time of soldering, for example, an attempt of adding a thermoplastic oligomer to the epoxy resin composition used for semiconductor sealing (Japanese Patent Application Kokai (Laid-Open) No. 115849/1987), an attempt of adding various silicone compounds to said epoxy resin composition (Japanese Patent Application Kokai (Laid-Open) No. 115850/1987, Japanese Patent Kokoku (Post-Exam. Publication) Nos. 116654/1987 and 128162/1987), and an attempt of using a silicone-modified epoxy resin composition (Japanese Patent Application Kokai (Laid-Open) No. 136860/1987). In each of these attempts, however, the Composition generated cracks in the package at the time of soldering, and hence it was impossible to obtain a highly reliable epoxy resin composition for semiconductor sealing.

Meanwhile, in order to obtain a heat-resistant epoxy resin composition having excellent resistance to soldering stress, there was investigated, for example, the use of a polyfunctional epoxy resin as the resin component for said composition [Japanese Patent Application Kokai (Laid-Open) No. 168620/1986]. The use of such a polyfunction epoxy resin gave a higher crosslinking density and higher heat resistance, but the resulting epoxy resin composition had no sufficient resistance to soldering stress particularly when exposed to high temperatures of 200-300° C.

The object of the present invention is to overcome the above problems and to provide an epoxy resin composition for semiconductor sealing which has very high resistance to soldering stress, by using, as an epoxy resin, a polyfunctional epoxy resin represented by the formula (I)

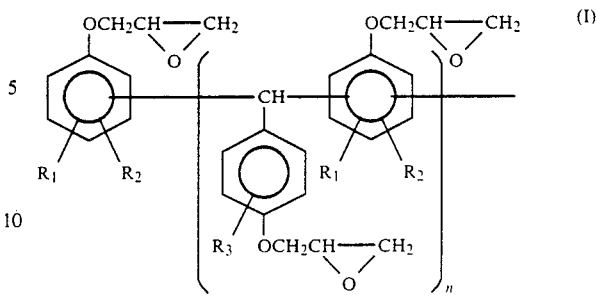

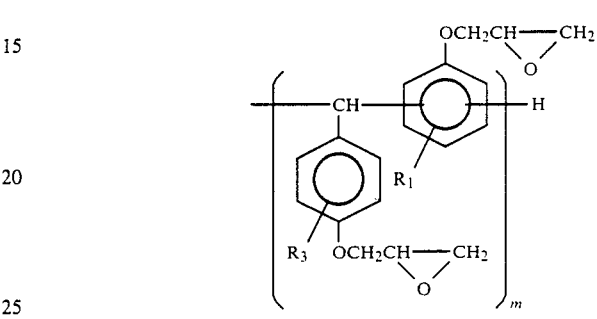

and, as a filler, a silica powder.

According to the present invention, by using in combination (A) a polyfunctional epoxy resin represented by the formula (I)

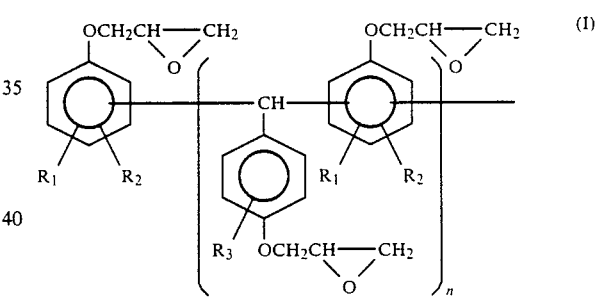

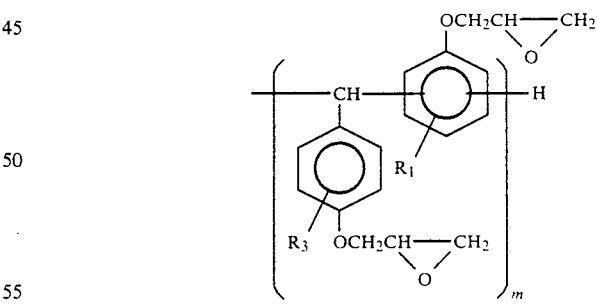

[n and m are each an integer of 9 or more, $n+m=1-10$, and $R_1$, $R_2$ and $R_3$ which may be the same or different, are each selected from hydrogen atom, an alkyl group and a halogen atom (e.g., Cl, Br) with the proviso that all of $R_1$, $R_2$ and $R_3$ must not be hydrogen atom simultaneously] and having at least three epoxy groups in the molecule, (B) a phenolic resin curing agent, (C) a silica filler, and (D) a curing accelerator, there can be obtained an epoxy resin composition having very high resistance to soldering stress which has been unattainable with the use of a conventional epoxy resin alone.

The epoxy resin composition of the present invention can exhibit an utmost resistance to soldering stress by controlling the amount of the epoxy resin used therein. In order for the epoxy resin composition to show sufficient resistance to soldering stress, it is desirable that the composition contain preferably at least 50% by weight, more preferably at least 70% by weight, based on total epoxy resin amount, of a polyfunctional epoxy resin represented by the formula (I). When the amount of the polyfunctional epoxy resin is less than 50% by weight based on total epoxy resin amount, the resulting epoxy resin composition has a low crosslinking density and accordingly insufficient resistance to soldering stress. In the formula (I), $R_1$ is preferably methyl group, $R_2$ is preferably tert-butyl group, and $R_3$ is preferably methyl group or hydrogen atom. In the formula (I), the ratio of n : m is preferably 1 : 0.1–0.6, more preferably 1 : 0.2–0.4.

When the ratio of n : m is such that n is 1 and m is smaller than 0.1, the resulting epoxy resin composition tends to have no sufficient curability during molding to make the moldability poor, although it poses no practical problem. When m is larger than 0.6, the resulting epoxy resin composition tends to show increased water absorbability, high thermal shock when immersed in solder, and poor resistance to soldering stress.

When n+m=0, or when the polyfunctional epoxy resin is replaced by a mono- or bi-functional epoxy resin, the resulting epoxy resin composition shows reduced curability, poor moldability, insufficient crosslinking density, inferior heat resistance and substantially no resistance to soldering stress. When n+m>10, the epoxy resin composition shows reduced fluidity and poor moldability.

The epoxy resin referred to herein includes all epoxy resins having epoxy group(s), for example, bisphenol type epoxy resins, novolac type epoxy resins and triazine nucleus-containing epoxy resins.

The silica filler used in the present invention includes porous silica powder, secondary agglomerated silica powder, silica powder obtained by grinding porous silica powder and/or secondary agglomerated silica powder, fused silica powder, crystalline silica powder, etc. If necessary, other fillers such as alumina and the like may be added to the epoxy resin composition of the present invention.

The phenolic resin curing agent used in the present invention includes phenolic novolac resin, cresol novolac resin, paraxylene-modified phenolic resin, tris(hydroxyphenyl)methane type phenolic resin, dicyclopentadiene-modified phenolic resin, etc. If necessary, other curing agents such as acid anhydride and the like may be added to the epoxy resin composition of the present invention.

When the silica filler (C) contains 5–80% by weight, based on total filler amount, of a porous silica powder having an average particle diameter of 5–40 $\mu$m, an apparent density of 0.1–0.6 g/cc and a specific surface area of 5–20 $m^2/g$, there is provided a preferable embodiment of the present invention. In this case, any of the polyfunctional epoxy resins represented by the formula (I) can be used in order to achieve the intended object of the present invention.

When the porous silica powder has an average Particle diameter of less than 5 $\mu$m or more than 40 $\mu$m, the resulting epoxy resin composition shows reduced fluidity, which is less preferable. When the porous silica powder has an apparent density of more than 0.6 g/cc, the resulting composition easily generates cracks owing to thermal stress by soldering and accordingly shows reduced moisture resistance, which is less preferable.

When the porous silica powder has a specific surface area of less than 5 $m^2/g$, the resulting composition easily generates cracks at soldering step and accordingly shows reduced moisture resistance. When the porous silica powder has a specific surface area of more than 20 $m^2/g$, the composition shows significantly reduced fluidity, which is less preferable.

When the porous silica powder is used in a amount of less than 5% by weight based on total filler amount, the resulting composition easily generates cracks at soldering step and accordingly shows reduced moisture resistance, which may make it difficult to obtain a composition having preferred properties.

When the porous silica powder is used in an amount of more than 80% by weight based on total filler amount, the resulting composition shows reduced fluidity and poor moldability, which is not as suitable for practical application.

When the silica filler (C) contains 5–80% by weight, based on total filler amount, of a secondary agglomerated silica powder having an average particle diameter of 20–60 $\mu$m, an apparent density of 0.1–0.6 g/cc and a specific surface area of 5 $m^2/g$ or less, there is also provided a preferable embodiment of the present invention. In this case also, any of the polyfunctional epoxy resins represented by the formula (I) can be used in order to achieve the intended object of the present invention.

When the secondary agglomerated silica powder has an average particle diameter of less than 20 $\mu$m, the resulting epoxy resin composition easily generates cracks owing to thermal stress by soldering and, when the silica powder has an average particle diameter of more than 60 $\mu$m, the composition shows reduced mold-ability, both of which are undesirable. The average particle diameter of the secondary agglomerated silica powder is preferably 20–40 $\mu$m. When the secondary agglomerated silica powder has an apparent density of more than 0.6 g/cc, the resulting composition easily generates cracks owing to thermal stress by soldering and accordingly shows reduced moisture resistance, which is undersirable.

When the second agglomerated silica powder has a specific surface area of more than 5 $m^2/g$, the resulting composition easily generates cracks at soldering step and accordingly shows reduced moisture resistance and significantly reduced fluidity, which is undesirable.

When the second agglomerated silica powder is contained in an amount of less than 5% by weight based on total filler amount, the resulting composition easily generates cracks at soldering step and accordingly shows reduced moisture resistance, which makes it difficult to obtain a composition having intended properties.

When the second agglomerated silica powder is contained in an amount of more than 80% by weight based on total filler amount, the resulting composition shows reduced fluidity and poor moldability, which is unsuitable for practical application.

As mentioned above, when the second agglomerated silica powder or the porous silica powder is contained in an amount of more than 80% by weight based on total filler amount, there is a problem that the resulting composition tends to show reduced fluidity and poor moldability. The problem has been solved by using, as the polyfunctional epoxy resin, a polyfunctional epoxy resin of the formula (I) wherein m=0 and, as the silica filler (C), 5-100% by weight, based on total filler amount, of a silica powder having an average particle diameter of 3-20 μm, an apparent density of 0.1-0.8 g/cc, a specific surface area of 1-20 m²/g and a boiled linseed oil absorbability of 0.2-1.2 ml/g, obtained by grinding a secondary agglomerated silica powder and/or a porous silica powder. That is, as a result, there has been obtained an epoxy resin composition for semiconductor sealing, which has very high resistance to soldering stress without reducing its moldability, as compared with the conventional resin compositions for semiconductor sealing.

As the polyfunctional epoxy resin of the formula (I) wherein m=0, there are preferred those of the formula (I) wherein $R_1$ is methyl group, $R_2$ is tert-butyl group, $R_3$ is hydrogen atom and n=1-3.

When the amount of the ground silica powder used is less than 5% by weight based on total filler amount, the resulting epoxy resin composition is unable to relax the stress generated at the time of immersion in solder and has reduced soldering stress. As mentioned before, when the secondary agglomerated silica powder and/or the porous silica powder is used as a filler, the resulting epoxy resin composition tends to show reduced fluidity and poor moldability. However, by grinding a secondary agglomerated silica powder and/or a porous silica powder to reduce its boiled linseed oil absorbability, there can be obtained sufficient fluidity.

When the silica powder obtained by grinding a secondary agglomerated silica powder and/or a porous silica powder has an average particle diameter of less than 3 μm, the resulting composition generates cracks owing to soldering heat stress. When the ground silica powder has an average particle diameter of more than 20 μm, the composition shows reduced fluidity. Therefore, the average particle diameter of the ground silica powder is required to be 3-20 μm, preferably 3-10 μm. When the apparent density of the ground silica powder is less than 0.1 g/cc, the resulting composition shows reduced fluidity. When the apparent density is more than 0.8 g/cc, the composition generates cracks owing to thermal stress by soldering and accordingly shows reduced moisture resistance. When the specific surface area of the ground silica powder is less than 1 m²/g, the resulting composition shows reduced strength when molded and generates cracks at soldering step. When the specific surface area is more than 20 m²/g, the composition shows reduced fluidity. When the boiled linseed oil absorbability of the ground silica powder is more than 1.2 ml/g, the resulting composition shows reduced fluidity and poor moldability. When the boiled linseed oil absorbability is less than 0.2 ml/g, the composition generates cracks owing to thermal stress by soldering. In order to obtain sufficient resistance to soldering stress, it is desirable to use the ground silica powder in an amount of at least 5% by weight, preferably at least 20% by weight based on total filler amount.

When there is used a polyfunctional epoxy resin of the formula (I) wherein m=0, there is a problem that the resulting epoxy resin composition tends to show reduced curability and accordingly poor moldability. The problem has been solved by using a polyfunctional epoxy resin of the formula (I) wherein n=1-9, m=1-9 and n+m=2-10 and, as the silica filler (C), 5-100% by weight, based on total filler amount, of a silica powder having an average particle diameter of 3-20 μm, an apparent density of 0.1-0.8 g/cc, a specific surface area of 1-20 m²/g and a boiled linseed oil absorbability of 0.2-1.2 ml/g, obtained by grinding a secondary agglomerated silica powder and/or a porous silica powder. That is, as a result, there has been obtained an epoxy resin composition for semiconductor sealing, which has very high resistance to soldering stress without reducing its moldability, as compared with the conventional resin compositions for semiconductor sealing.

As the polyfunctional epoxy resin of the formula (I) wherein n=1-9, m=1-9 and n+m=2-10, there are preferred those of the formula (I) wherein $R_1$ is methyl group, $R_2$ is tert-butyl group, $R_3$ is hydrogen atom and (n+1) : m=3 : 1.

The property ranges and use conditions of the ground silica powder, as well as the reasons therefor are the same as described previously.

When there is used a polyfunctional epoxy resin of the formula (I) wherein $R_1$ is methyl group, $R_2$ is tert-butyl group, $R_3$ is hydrogen atom and (n+1) : m=3 : 1, there is provided a preferable embodiment of the present invention. In this case, as the silica filler (C) there can be used any of silica fillers in order to achieve the intended object of the present invention.

In the above case, when the ratio of (n+1) : m is such that (n+1) is 3 and m is smaller than 1, the resulting composition tends to have no sufficient curability during molding and accordingly poor moldability. When m is larger than 1, the composition tends to show increased water absorbability, high thermal shock when immersed in solder, and poor resistance to soldering stress.

When there is used a polyfunctional epoxy resin of the formula (I) wherein $R_1$ is methyl group, $R_2$ is tert-butyl group, $R_3$ is hydrogen atom and m=0, there is also provided a preferable embodiment of the present invention. In this case also, as the silica filler (C) there can be used any of silica fillers in order to achieve the intended object of the present invention. The case of n=1-3 is particularly preferable.

By using, as an epoxy resin, a polyfunctional epoxy resin of the formula (I) wherein $R_1$ is methyl group, $R_2$ is tert-butyl group, $R_3$ is hydrogen atom and (n+1) : m=3 : 1 and, as a phenolic resin curing agent, 30-100% by weight, based on total phenolic resin curing agent, of a paraxylene-modified phenolic resin curing agent represented by the formula (II)

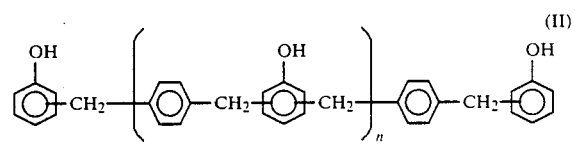

(n is an integer of 0-5), there can be obtained an epoxy resin composition for semiconductor sealing which has very high resistance to soldering stress.

The phenolic resin curing agent represented by the formula (II) is obtained by condensing phenol and an aralkyl ether (α,α'-dimethoxyparaxylene) according to Friedel-Craft reaction. By using this paraxylene-modified phenolic resin, there can be obtained an epoxy resin composition having very high resistance to soldering stress which has been unobtainable according to the prior art.

By controlling the amount of the paraxylenemodified phenolic resin used, the epoxy resin composition of the present invention can exhibit an utmost resistance to soldering stress. In order for the epoxy resin composition to show sufficient resistance to soldering stress, it is desirable to use the paraxylene-modified phenolic resin in an amount of at least 30% by weight, preferably at least 50% by weight based on total phenolic resin curing agent amount When the amount of the paraxylene-modified phenolic resin is less than 50% by weight, the resulting epoxy resin composition has low water resistance, low flexibility, low adhesion to lead frame and insufficient resistance to soldering stress.

In the formula (II), n is 0-5. When n is larger than 5, the resulting composition tends to show reduced fluidity and poor moldability.

When there is used, for example, a phenolic novolac resin curing agent containing no paraxylene in the main chain, the resulting epoxy resin composition has low water resistance, low adhesion to lead frame, increased shock due to vaporization of steam and no sufficient resistance to soldering stress.

By using, as an epoxy resin, a polyfunctional epoxy resin of the formula (I) wherein $R_1$ is methyl group, $R_2$ is tert-butyl group, $R_3$ is hydrogen atom and $(n+1) : m = 3 : 1$ and, as a phenolic resin curing agent, 50-100% by weight, based on total phenolic resin curing agent amount, of a tris(hydroxyphenyl)methane type phenolic resin curing agent represented by the formula (III)

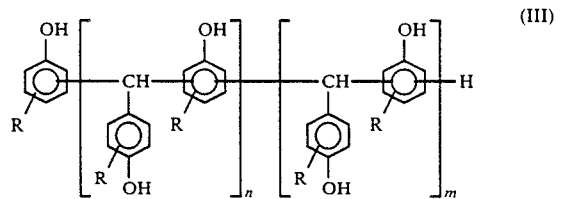

(n and m are each an integer of 0-10, $n+m=1-10$, and R is selected from hydrogen atom, methyl group, ethyl group, propyl group, butyl group, tert-butyl group or the combination thereof), there can also be obtained an epoxy resin composition for semiconductor sealing which has very high resistance to soldering stress.

The phenolic resin curing agent represented by the formula (III) is a polyfunctional phenolic resin curing agent having at least three hydroxyl groups in the molecule By using this polyfunctional phenolic resin curing agent, there can be obtained an epoxy resin composition having very high resistance to soldering stress which has been unobtainable according to the prior art.

By controlling the amount of the above phenolic resin curing agent used, the epoxy resin composition of the present invention can exhibit an utmost resistance to soldering stress.

In order for the epoxy resin composition to show sufficient resistance to soldering stress, it is desirable to use at least 50% by weight, preferably at least 70% by weight, based on total phenolic resin curing agent amount, of a tris(hydroxyphenyl)methane type phenolic resin curing agent represented by the formula (III). When the amount of the curing agent used is less than 50% by weight, the resulting epoxy resin composition has low crosslinking density and insufficient resistance to soldering stress.

In the formula (III), each R is preferably hydrogen atom or an alkyl group of 1-4 carbon atoms. When each R is an alkyl group of 5 or more carbon atoms, the phenolic resin curing agent shows reducing reactivity with the epoxy resin and the resulting epoxy resin composition has poor curability. When there is used a phenolic resin curing agent of mono- or bi-functionally, the resulting composition has low crosslinking density, poor heat resistance and no sufficient resistance to soldering stress. In the formula (III), $(n+m)$ is 1-10. When $(n+m)$ is larger than 10, the resulting composition tends to show reduced fluidity and poor moldability.

By using, as an epoxy resin, a polyfunctional epoxy resin of the formula (I) wherein $R_1$ is methyl group, $R_2$ is tert-butyl group, $R_3$ is hydrogen atom and $(n+1) : m = 3 : 1-0$ and, as a phenolic resin curing agent, 50-100% by weight, based on total phenolic resin curing agent amount, of a dicyclopentadiene-modified phenolic resin curing agent represented by the following formula (IV)

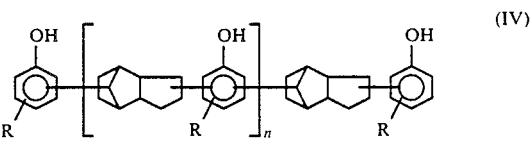

(n is an integer of 0-5 and each R is an atom or group selected from hydrogen atom, a halogen atom and an alkyl group of 1-4 carbon atoms), there can also be obtained an epoxy resin composition which has very high resistance to soldering stress as compared with the conventional epoxy resin compositions.

The dicyclopentadiene-modified phenolic resin curing agent having a structure represented by the formula (IV) is characterized by having in the molecule a dicyclopentadiene structure having flexibility. By using this phenolic resin curing agent, there can be obtained an epoxy resin composition having high flexibility and good resistance to soldering stress.

By controlling the amount of the dicyclopentadiene-modified phenolic resin curing agent used, the epoxy resin composition of the present invention can exhibit an utmost resistance to soldering stress. In order for the epoxy resin composition to show sufficient resistance to soldering stress, it is desirable to use the dicyclopentadiene-modified phenolic resin curing agent in an amount of at least 50% by weight, preferably at least 70% by weight based on total curing agent amount. When the amount of said curing agent is less than 50% by weight, the resulting epoxy resin composition has low flexibility and insufficient resistance to soldering stress.

In preparing the epoxy resin composition of the present invention, it is necessary that the epoxy resin and the phenolic resin curing agent be used so that the number of the epoxy groups of the epoxy resin is in a range of 0.5-2 per hydroxyl group of the curing agent. When the number of said epoxy groups is less than 0.5 or more than 2, the resulting epoxy resin composition has poor moisture resistance and poor moldability and the cured product of said composition has poor electrical properties. The number of the epoxy groups of the epoxy resin is preferably 1.1-1.3 per hydroxyl group of the curing agent. When the number of said epoxy groups is less than 1.1 or more than 1.3, the resulting composition tends to show increased water absorbability, increased thermal shock when immersed in solder, and poor resistance to soldering stress.

The curing accelerator (D) used in the present invention can be any curing accelerator as long as it can accelerate the reaction between the epoxy groups of the epoxy resin and the phenolic hydroxyl groups. As the curing accelerator (D), there can be used various curing accelerators conventionally used in sealing materials. There can be used, for example, diazabicycloundecane (DBU), triphenylphosphine (TPP), dimethylbenzylamine (BDMA) and 2-methylimidazole (2MZ). These compounds can be used alone or in combination of two or more.

The sealing epoxy resin composition according to the present invention comprises, as essential components a polyfunctional epoxy resin, a phenolic resin curing agent, a silica filler and a curing accelerator. The composition may further comprise, if necessary, various additives such as flame retardant (e.g., silane coupling agent, brominated epoxy resin, antimony trioxide, hexabromobenzene), coloring agent (e.g., carbon black, red oxide), releasing agent (e.g., natural wax, synthetic wax), low stress additive (e.g., silicone oil, rubber) and the like.

When the sealing epoxy resin composition according to the present invention is produced as a molding material, there are uniformly mixed an epoxy resin, a phenolic resin curing agent, a curing accelerator, a silica filler and other additives by means of a mixer or the like; the resulting mixture is melt-kneaded by means of a hot roll, a kneader or the like; and after cooling, the mixture is ground to obtain a molding material. This molding material can be used for sealing, coating, insulating, etc. of electronic parts and electric parts.

As described above, according to the present invention, by appropriately selecting the types and amounts of a polyfunctional epoxy resin, a phenolic resin curing agent, a silica filler and a curing accelerator and compounding these components, there can be obtained an epoxy resin composition having heat resistance, flexibility and low water absorbability which has been unobtainable according to the prior art. Accordingly, the epoxy resin composition of the present invention has very high crack resistance when subjected to thermal stress by rapid temperature change at soldering step, and further has good moisture resistance. Therefore, the present epoxy resin composition can be suitably used for sealing, coating, insulation, etc. of electronic and electric parts, particularly high integration large chip ICs mounted on surface mounting packages and requiring high degree of reliability.

Next, the present invention is described specifically by way of Examples.

EXAMPLE I-1

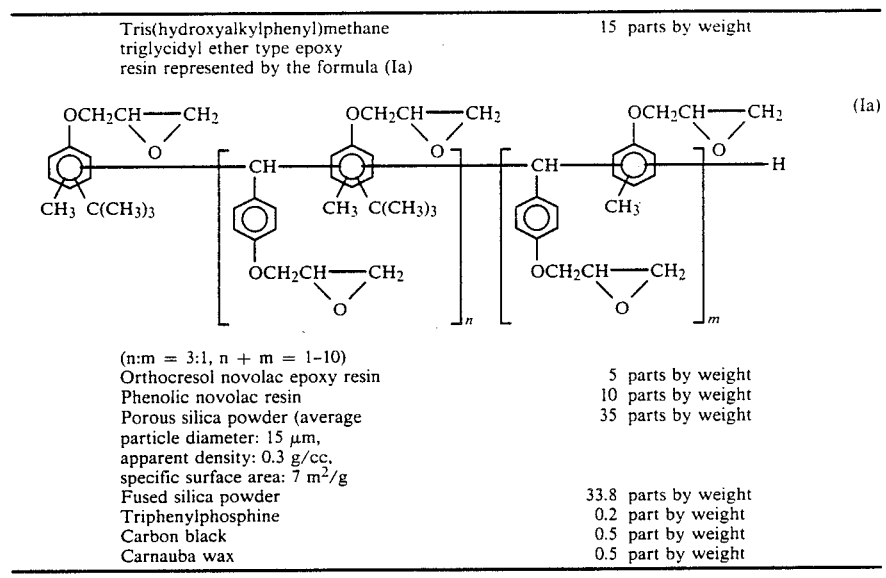

| | |
|---|---|
| Tris(hydroxyalkylphenyl)methane triglycidyl ether type epoxy resin represented by the formula (Ia) | 15 parts by weight |
| (n:m = 3:1, n + m = 1–10) | |
| Orthocresol novolac epoxy resin | 5 parts by weight |
| Phenolic novolac resin | 10 parts by weight |
| Porous silica powder (average particle diameter: 15 μm, apparent density: 0.3 g/cc, specific surface area: 7 m²/g | 35 parts by weight |
| Fused silica powder | 33.8 parts by weight |
| Triphenylphosphine | 0.2 part by weight |
| Carbon black | 0.5 part by weight |
| Carnauba wax | 0.5 part by weight |

The above materials were mixed at normal temperature by means of a mixer. The mixture was kneaded at 70–100° C. by means of twin rolls. After cooling, the mixture was ground to obtain a molding material.

The molding material was shaped into tablets. From the tablets was prepared a 6×6 m chip for soldering crack test using a low pressure transfer molding machine under conditions of 175° C., 70 kg/cm² and 120 seconds. The chip was used for sealing of a 52p package. Also, a 3×6 mm chip for soldering-moisture resistance test was prepared in the same manner and used for sealing of a 16p SOP package.

The resulting sealed test devices were subjected to the following soldering crack test and solderingmoisture resistance test.

SOLDERING CRACK TEST

The sealed test device (sealed 52p package) was placed under conditions of 85° C. and 85% R.H. for 48 hours and 72 hours and then immersed in a solder bath of 250° C. for 10 seconds. Thereafter, the cracks formed on the surface of the sealed test device were observed using a microscope.

SOLDERING-MOISTURE RESISTANCE TEST

The sealed test device (sealed 16p SOP package) was placed under conditions of 85° C. and 85% R.H. for 72 hours, then immersed in a solder bath of 250° C. for 10 seconds, and subjected to a pressure cooker test (125° C. × 100% R.H.) to measure a time to 50% poor opening of the circuit.

The test results are shown in Table I.

EXAMPLES I-2 to I-7

Compounding was effected according to the recipes of Table I and the subsequent kneading and grinding were effected in the same manner as in Example I-1 to obtain molding materials. From these molding materials were prepared sealed moldings for test purpose, in the same manner as in Example I-1. The moldings were subjected to the same soldering crack test and solderingmoisture resistance test as in Example I-1. The test results are shown in Table I.

COMPARATIVE EXAMPLES I-1 to I-6

Compounding was effected according to the recipes of Table I and the subsequent kneading and grinding were effected in the same manner as in Example I-1 were effected in the same manner as in Example I-1 obtain molding materials. From these molding materials were prepared sealed moldings for test purpose, in the same manner as in Example I-1. The moldings were subjected to the same soldering crack test and solderingmoisture resistance test as in Example I-1. The test results are shown in Table I.

TABLE I

|  |  | Example |  |  |  |  |  |  |
|---|---|---|---|---|---|---|---|---|
|  |  | I-1 | I-2 | I-3 | I-4 | I-5 | I-6 | I-7 |
| Tris(hydroxyphenyl)methane triglycidyl ether type epoxy resin | (parts by weight) | 15 | 20 | 20 | 15 | 20 | 10 | 10 |
| Orthocresol novolac epoxy resin | (parts by weight) | 5 | 0 | 0 | 5 | 0 | 10 | 10 |
| Porous silica powder | (parts by weight) | 35 | 35 | 52.5 | 52.5 | 3.5 | 3.5 | 52.5 |
| Fused silica powder | (parts by weight) | 33.8 | 33.8 | 16.3 | 16.3 | 65.3 | 65.3 | 16.3 |
| Phenolic novolac resin | (parts by weight) |  |  |  | 10 |  |  |  |
| Triphenylphosphine | (parts by weight) |  |  |  | 0.2 |  |  |  |
| Carbon black | (parts by weight) |  |  |  | 0.5 |  |  |  |
| Carnauba wax | (parts by weight) |  |  |  | 0.5 |  |  |  |
| Soldering crack test (number of cracked samples/total number) | Moisture absorption 48 hr | 0/16 | 0/16 | 0/16 | 0/16 | 0/16 | 0/16 | 0/16 |
|  | Moisture absorption 72 hr | 2/16 | 0/16 | 0/16 | 0/16 | 2/16 | 4/16 | 2/16 |
| Average life in soldering-moisture resistance test | (hr) | 300< | 300< | 300< | 300< | 300< | 300< | 300< |

|  |  | Comparative Example |  |  |  |  |  |
|---|---|---|---|---|---|---|---|
|  |  | I-1 | I-2 | I-3 | I-4 | I-5 | I-6 |
| Tris(hydroxyphenyl)methane triglycidyl ether type epoxy resin | (parts by weight) | 20 | 10 | 5 | 5 | 0 | 0 |
| Orthocresol novolac epoxy resin | (parts by weight) | 0 | 10 | 15 | 15 | 20 | 20 |
| Porous silica powder | (parts by weight) | 0 | 0 | 3.5 | 52.5 | 52.5 | 0 |
| Fused silica powder | (parts by weight) | 68.8 | 68.8 | 65.3 | 16.3 | 16.3 | 68.8 |
| Phenolic novolac resin | (parts by weight) |  |  |  |  |  |  |
| Triphenylphosphine | (parts by weight) |  |  |  |  |  |  |
| Carbon black | (parts by weight) |  |  |  |  |  |  |
| Carnauba wax | (parts by weight) |  |  |  |  |  |  |
| Soldering crack test (number of cracked samples/total number) | Moisture absorption 48 hr | 3/16 | 10/16 | 10/16 | 8/16 | 10/16 | 16/16 |
|  | Moisture absorption 72 hr | 8/16 | 12/16 | 14/16 | 12/16 | 14/16 | 16/16 |
| Average life in soldering-moisture resistance test | (hr) | 200 | 160 | 180 | 160 | 140 | 120 |

EXAMPLE II-I

| Tris(hydroxyalkylphenyl)methane triglycidyl ether type epox resin represented by the formula (Ia) | 15 parts by weight |
|---|---|

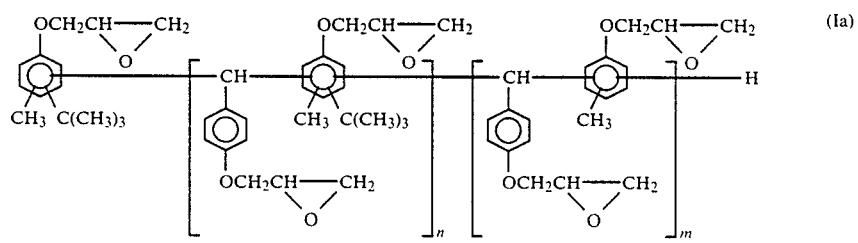

(n:m = 3:1, n + m = 1-10)

| Orthocresol novolac epoxy resin | 5 parts by weight |
|---|---|
| Phenolic novolac resin | 10 parts by weight |
| Secondary agglomerated silica powder (average particle diameter: 35 μm, apparent density: 0.3 g/cc, specific surface area: 3 m²/g) | 35 parts by weight |
| Fused silica powder | 33.8 parts by weight |
| Triphenylphosphine | 0.2 part by weight |

-continued

| | |
|---|---|
| Carbon black | 0.5 part by weight |
| Carnauba wax | 0.5 part by weight |

The above materials were mixed at normal temperature by means of a mixer. The mixture was kneaded at 70-100° C. by means of twin rolls. AFter cooling, the mixture was ground to obtain a molding material. From the molding material were prepared sealed moldings for test purpose, in the same manner as in Example I-1. The moldings were subjected to the same soldering crack test and soldering-moisture resistance test as in Example I-1.

The test results are shown in Table II.

EXAMPLES II-2 to II-7

Compounding was effected according to the recipes of Table II and the subsequent kneading and grinding were effected in the same manner as in Example II-1 to obtain molding materials. From these molding materials were prepared sealed moldings for test purpose, in the same manner as in Example I-1. The moldings were subjected to the same soldering crack test and solderingmoisture resistance test as in Example I-1. The test results are shown in Table II.

COMPARATIVE EXAMPLES II-1 to II-6

Compounding was effected according to the recipes of Table II and the subsequent kneading and grinding were effected in the same manner as in Example II-1 to obtain molding materials. From these molding materials were prepared sealed moldings for test purpose, in the same manner as in Example I-1. The moldings were subjected to the same soldering crack test and soldering moisture resistance test as in Example I-1. The test results are shown in Table II.

TABLE II

| | | Example | | | | | | |
|---|---|---|---|---|---|---|---|---|
| | | II-1 | II-2 | II-3 | II-4 | II-5 | II-6 | II-7 |
| Tris(hydroxyphenyl)methane triglycidyl ether type epoxy resin | (parts by weight) | 15 | 20 | 20 | 15 | 20 | 10 | 10 |
| Orthocresol novolac epoxy resin | (parts by weight) | 5 | 0 | 0 | 5 | 0 | 10 | 10 |
| Secondary agglomerated silica powder | (parts by weight) | 35 | 35 | 52.5 | 52.5 | 3.5 | 3.5 | 52.5 |
| Fused silica powder | (parts by weight) | 33.8 | 33.8 | 16.3 | 16.3 | 65.3 | 65.3 | 16.3 |
| Phenolic novolac resin | (parts by weight) | | | | 10 | | | |
| Triphenylphosphine | (parts by weight) | | | | 0.2 | | | |
| Carbon black | (parts by weight) | | | | 0.5 | | | |
| Carnauba wax | (parts by weight) | | | | 0.5 | | | |
| Soldering crack test (number of cracked samples/total number) | Moisture absorption 48 hr | 0/16 | 0/16 | 0/16 | 0/16 | 0/16 | 0/16 | 0/16 |
| | Moisture absorption 72 hr | 2/16 | 0/16 | 0/16 | 0/16 | 2/16 | 4/16 | 2/16 |
| Average life in soldering-moisture resistance test | (hr) | 300< | 300< | 300< | 300< | 300< | 300< | 300< |

| | | Comparative Example | | | | | |
|---|---|---|---|---|---|---|---|
| | | II-1 | II-2 | II-3 | II-4 | II-5 | II-6 |
| Tris(hydroxyphenyl)methane triglycidyl ether type epoxy resin | (parts by weight) | 20 | 10 | 5 | 5 | 0 | 0 |
| Orthocresol novolac epoxy resin | (parts by weight) | 0 | 10 | 15 | 15 | 20 | 20 |
| Secondary agglomerated silica powder | (parts by weight) | 0 | 0 | 3.5 | 52.5 | 52.5 | 0 |
| Fused silica powder | (parts by weight) | 68.8 | 68.8 | 65.3 | 16.3 | 16.3 | 68.8 |
| Phenolic novolac resin | (parts by weight) | | | | | | |
| Triphenylphosphine | (parts by weight) | | | | | | |
| Carbon black | (parts by weight) | | | | | | |
| Carnauba wax | (parts by weight) | | | | | | |
| Soldering crack test (number of cracked samples/total number) | Moisture absorption 48 hr | 3/16 | 10/16 | 10/16 | 8/16 | 10/16 | 16/16 |
| | Moisture absorption 72 hr | 8/16 | 12/16 | 14/16 | 12/16 | 14/16 | 16/16 |
| Average life in soldering-moisture resistance test | (hr) | 200 | 160 | 180 | 160 | 140 | 120 |

EXAMPLE III-I

| | |
|---|---|
| Tris(hydroxyalkylphenyl)methane triglycidyl ether type epoxy resin represented by the formula (Ib) | 20 parts by weight |

$$\left[ \begin{array}{c} O-CH_2CH-CH_2 \\ \diagdown O \diagup \end{array} \underset{CH_3 \ C(CH_3)_3}{\bigcirc} \right. \left[ -CH- \underset{}{\bigcirc} \right. \left. \underset{CH_3 \ C(CH_3)_3}{\bigcirc} \begin{array}{c} O-CH_2-CH-CH_2 \\ \diagdown O \diagup \end{array} H \right. \\ \left. \begin{array}{c} O-CH_2-CH-CH_2 \\ \diagdown O \diagup \end{array} \right]_n \quad (Ib)$$

[the above resin is a mixture of three formula (Ib) resins (n = 1, 2 and 3) wherein the mixing ratio is 8 (n = 1):1 (n = 2):1 (n = 3)]

| | |
|---|---|
| Silica powder obtained by grinding secondary agglomerated silica powder (average particle diameter: 5 μm, apparent density: 0.5 g/cc, specific surface area: 16 m²/g, boiled linseed oil absorbability: 0.7 ml/g) | 68.8 parts by weight |
| Phenolic novolac resin | 10 parts by weight |
| Triphenylphosphine | 0.2 part by weight |
| Carbon black | 0.5 part by weight |
| Carnauba wax | 0.5 part by weight |

The above materials were mixed at normal temperature by means of a mixer. The mixture was kneaded at 70–100° C. by means of twin rolls. After cooling, the mixture was ground to obtain a molding material.

From the molding material were prepared sealed moldings for test purpose, in the same manner as in Example I-1. The moldings were subjected to the same soldering crack test and soldering-moisture resistance test as in Example I-1.

The test results are shown in Table III.

EXAMPLE III-2

| | |
|---|---|
| Tris(hydroxyalkylphenyl)methane triglycidyl ether type epoxy resin represented by the formula (Ib) shown in Example III-1 | 10 parts by weight |
| Orthocresol novolac epoxy resin | 10 parts by weight |
| Silica powder obtained by grinding porous silica powder (average particle diameter: 6 μm, apparent density: 0.5 g/cc, specific surface area: 10 m²/g, boiled linseed oil absorbability: 0.6 ml/g) | 34.4 parts by weight |
| Fused silica powder | 34.4 parts by weight |
| Phenolic novolac resin | 10 parts by weight |
| Triphenylphosphine | 0.2 part by weight |
| Carbon black | 0.5 part by weight |
| Carnauba wax | 0.5 part by weight |

The above materials were shaped into a molding material in the same manner as in Example III-1. From the molding material were prepared sealed moldings for test purpose in the same manner as in Example I-1. The moldings were subjected to the same soldering crack test and soldering-moisture resistance test as in Example I-1. The test results are shown in Table III.

EXAMPLES III-3 to III-5

Compounding was effected according to the recipes of Table III and the subsequent kneading and grinding were effected in the same manner as in Example III-1 to obtain molding materials. From these molding materials were prepared sealed moldings for test purpose in the same manner as in Example I-1. The moldings were subjected to the same soldering crack test and solderingmoisture resistance test as in Example I-1. The test results are shown in Table III.

COMPARATIVE EXAMPLES III-1 to III-6

Compounding was effected according to the recipes of Table III and the subsequent kneading and grinding were effected in the same manner as in Example III-1 to obtain molding materials. From these molding materials were prepared sealed moldings for test purpose in the same manner as in Example I-1. The moldings were subjected to the same soldering crack test and solderingmoisture resistance test as in Example I-1. The test results are shown in Table III.

TABLE III

| | | Example | | | | |
|---|---|---|---|---|---|---|
| | | III-1 | III-2 | III-3 | III-4 | III-5 |
| Tris(hydroxyalkylphenyl)methane triglycidyl ether type epoxy resin (Ib) | (parts by weight) | 20 | 10 | 12 | 20 | 10 |
| Orthocresol novolac epoxy resin | (parts by weight) | | 10 | 8 | 0 | 10 |
| Silica powder obtained by grinding secondary agglomerated silica powder | (parts by weight) | 68.8 | | 3.5 | 17.2 | 34.4 |
| Silica powder obtained by grinding porous silica powder | (parts by weight) | | 34.4 | | 17.2 | 34.4 |
| Fused silica powder | (parts by weight) | | 34.4 | 65.5 | 34.4 | |
| Phenolic novolac resin | (parts by weight) | | | 10 | | |
| Triphenylphosphine | (parts by weight) | | | 0.2 | | |
| Carbon black | (parts by weight) | | | 0.5 | | |
| Carnauba wax | (parts by weight) | | | 0.5 | | |
| Soldering crack test (number of cracked samples/total number) | Moisture absorption 48 hr | 0/16 | 0/16 | 0/16 | 0/16 | 0/16 |
| | Moisture absorption 72 hr | 0/16 | 1/16 | 2/16 | 0/16 | 1/16 |
| Average life in soldering-moisture resistance test (time to 50% poor opening of circuit) | (hr) | 300< | 300< | 300< | 300< | 300< |

| | | Comparative Example | | | | | |
|---|---|---|---|---|---|---|---|
| | | III-1 | III-2 | III-3 | III-4 | III-5 | III-6 |
| Tris(hydroxyalkylphenyl)methane triglycidyl ether type epoxy resin (Ib) | (parts by weight) | | 8 | 6 | 10 | 20 | 12 |
| Orthocresol novolac epoxy resin | (parts by weight) | 20 | 12 | 14 | 10 | | 8 |
| Silica powder obtained by grinding secondary agglomerated silica powder | (parts by weight) | | 3.5 | | | | |
| Silica powder obtained by grinding porous silica powder | (parts by weight) | | | 68.8 | | | 2.8 |
| Fused silica powder | (parts by weight) | 68.8 | 65.3 | | 68.8 | 68.8 | 66.0 |
| Phenolic novolac resin | (parts by weight) | | | | | | |
| Triphenylphosphine | (parts by weight) | | | | | | |
| Carbon black | (parts by weight) | | | | | | |
| Carnauba wax | (parts by weight) | | | | | | |
| Soldering crack test (number of cracked samples/total number) | Moisture absorption 48 hr | 16/16 | 4/16 | 4/16 | 3/16 | 2/16 | 2/16 |
| | Moisture absorption 72 hr | 16/16 | 9/16 | 8/16 | 10/16 | 9/16 | 6/16 |
| Average life in soldering-mositure resistance test (time to 50% poor opening of circuit) | (hr) | 80 | 120 | 120 | 160 | 160 | 200 |

EXAMPLE IV-1

| | |
|---|---|
| (Tris(hydroxyalkylphenyl)methane triglycidyl ether type epoxy resin represented by the formula (Ic) | 12 parts by weight |

$$(Ic)$$

[chemical structure of formula (Ic): tris(hydroxyalkylphenyl)methane triglycidyl ether type epoxy resin with repeating units n and m, bearing O—CH₂—CH—CH₂ epoxide groups and CH₃, C(CH₃)₃ substituents]

| | |
|---|---|
| [the above resin is a mixture of two formula (Ic) resins (a resin of n = 2 and m = 1 and a resin of n = 5 and m = 2) wherein the mixing ratio of the former and latter resins is 8:2] | |
| Orthocresol novolac epoxy resin | 8 parts by weight |
| Silica powder obtained by grinding secondary agglomerated silica powder (average particle diameter: 6 μm, apparent density: 0.5 g/cc, specific surface area: 14 m²/g, boiled linseed oil absorbability: 0.7 ml/g) | 3.5 parts by weight |
| Fused silica powder | 65.3 parts by weight |
| Phenolic novolac resin | 10 parts by weight |
| Triphenylphosphine | 0.2 part by weight |
| Carbon black | 0.5 part by weight |
| Carnauba wax | 0.5 part by weight |

The above materials were mixed at normal temperature by means of a mixer. The mixture was kneaded at 70–100° C. by means of twin rolls. After cooling, the mixture was ground to obtain a molding material.

From the molding material were prepared sealed moldings for test purpose in the same manner as in Example I-1. The moldings were subjected to the same soldering crack test and soldering-moisture resistance test as in Example I-1 and also to the following curability test.

CURABILITY TEST

Hardness when molded was measured at a Barcol hardness 935.

The test results are shown in Table IV.

EXAMPLE IV-2

| | |
|---|---|
| Tris(hydroxyalkylphenyl)methane triglycidyl ether type epoxy resin represented by the formula (Ic) shown in Example IV-1 | 20 parts by weight |
| Silica powder obtained by grinding porous silica powder (average particle diameter: 5 μm, apparent density: 0.6 g/cc, specific surface area: 10 m²/g, boiled linseed oil absorbability: 0.6 ml/g) | 68.8 parts by weight |
| Phenolic novolac resin | 10 parts by weight |
| Triphenylphosphine | 0.2 part by weight |
| Carbon black | 0.5 part by weight |
| Carnauba wax | 0.5 part by weight |

The above materials were compounded, kneaded and ground in the same manner as in Example IV-1 to obtain a molding material. From this molding material were prepared sealed moldings for test purpose in the same manner as in Example I-1. The moldings were subjected to the same soldering crack test, soldering-moisture resistance test and curability test as in Example IV-1.

The test results are shown in Table IV.

EXAMPLES IV-3 to IV-6

Compounding was effected according to the recipes of Table IV and the subsequent kneading and grinding were effected in the same manner as in Example IV-1 to obtain molding materials. From the molding materials were prepared sealed moldings for test purpose in the same manner as in Example I-1. The moldings were subjected to the same soldering crack test, soldering-moisture resistance test and curability test as in Example IV-1. The test results are shown in Table IV.

COMPARATIVE EXAMPLE IV-1

| | |
|---|---|
| Tris(hydroxyalkylphenyl)methane triglycidyl ether type epoxy resin represented by the formula (Ib) | 20 parts by weight |

$$(Ib)$$

[chemical structure of formula (Ib): tris(hydroxyalkylphenyl)methane triglycidyl ether type epoxy resin with repeating unit n, bearing O—CH₂—CH—CH₂ epoxide groups and CH₃, C(CH₃)₃ substituents]

| | |
|---|---|
| [the above resin is a mixture of three formula (Ib) resins (n = 1, 2 and 3) wherein the mixing ratio is 8 (n = 1):1 (n = 2):1 (n = 3)] | |
| Silica powder obtained by grinding porous silica powder (average particle diameter: 5 μm, apparent density: 0.5 g/cc, specific surface area: 16 m²/g, boiled linseed | 68.8 parts by weight |

-continued

| | |
|---|---|
| oil absorbability: 0.7 ml/g) | |
| Phenolic novolac resin | 10 parts by weight |
| Triphenylphosphine | 0.2 part by weight |
| Carbon black | 0.5 parts by weight |
| Carnauba wax | 0.5 part by weight |

The above materials were compounded, kneaded and ground in the same manner as in Example IV-1 to obtain a molding material. From the molding material were prepared sealed moldings for test purpose in the same manner as in Example I-1. The moldings were subjected to the same soldering crack test, soldering-moisture resistance test and curability test as in Example IV-1. The test results are shown in Table IV.

COMPARATIVE EXAMPLES IV-2 to IV-7

Compounding was effected according to the recipes of Table IV and the subsequent kneading and grinding were effected in the same manner as in Example IV-1 to obtain molding materials. From the molding materials were prepared sealed moldings for test purpose in the same manner as in Example I-1. The moldings were subjected to the same soldering crack test, soldering-moisture resistance test and curability test as in Example IV-1. The test results are shown in Table IV.

TABLE IV

| | | Example | | | | | |
|---|---|---|---|---|---|---|---|
| | | IV-1 | IV-2 | IV-3 | IV-4 | IV-5 | IV-6 |
| Tris(hydroxyphenyl)methane triglycidyl ether type epoxy resin (Ic) | (parts by weight) | 12 | 20 | 20 | 14 | 20 | 10 |
| Tris(hydroxyalkylphenyl)methane triglycidyl ether type epoxy resin (Ib) | (parts by weight) | 0 | 0 | 0 | 0 | 0 | 0 |
| Orthocresol novolac epoxy resin | (parts by weight) | 8 | 0 | 0 | 6 | 0 | 10 |
| Silica powder obtained by grinding secondary agglomerated silica powder | (parts by weight) | 3.5 | 0 | 34.4 | 34.4 | 0 | 17.2 |
| Silica powder obtained by grinding porous silica powder | (parts by weight) | 0 | 68.8 | 0 | 0 | 3.5 | 17.2 |
| Fused silica powder | (parts by weight) | 65.3 | 0 | 34.4 | 34.4 | 65.3 | 34.4 |
| Phenolic novolac resin | (parts by weight) | | | | 10 | | |
| Triphenylphosphine | (parts by weight) | | | | 0.2 | | |
| Carbon black | (parts by weight) | | | | 0.5 | | |
| Carnauba wax | (parts by weight) | | | | 0.5 | | |
| Soldering crack test (number of cracked samples/total number) | Moisture absorption 48 hr | 0/16 | 0/16 | 0/16 | 0/16 | 0/16 | 0/16 |
| | Moisture absorption 72 hr | 2/16 | 0/16 | 0/16 | 0/16 | 1/16 | 1/16 |
| Average life in soldering-moisture resistance test (time to 50% poor opening of circuit) | (hr) | 300< | 300< | 300< | 300< | 300< | 300< |
| Curability test | Barcol hardness 935 | 75–85 | 70–80 | 70–80 | 75–85 | 70–80 | 75–85 |

| | | Comparative Example | | | | | | |
|---|---|---|---|---|---|---|---|---|
| | | IV-1 | IV-2 | IV-3 | IV-4 | IV-5 | IV-6 | IV-7 |
| Tris(hydroxyphenyl)methane triglycidyl ether type epoxy resin (Ic) | (parts by weight) | 0 | 0 | 8 | 12 | 20 | 20 | 0 |
| Tris(hydroxyalkylphenyl)methane triglycidyl ether type epoxy resin (Ib) | (parts by weight) | 20 | 0 | 0 | 0 | 0 | 0 | 0 |
| Orthocresol novolac epoxy resin | (parts by weight) | 0 | 20 | 12 | 8 | 0 | 0 | 20 |
| Silica powder obtained by grinding secondary agglomerated silica powder | (parts by weight) | 0 | 0 | 3.5 | 2.8 | 0 | 0 | 0 |
| Silica powder obtained by grinding porous silica powder | (parts by weight) | 68.8 | 0 | 0 | 0 | 2.8 | 0 | 68.8 |
| Fused silica powder | (parts by weight) | 0 | 68.8 | 65.3 | 66.0 | 66.0 | 68.8 | 0 |
| Phenolic novolac resin | (parts by weight) | | | | | | | |
| Triphenylphosphine | (parts by weight) | | | | | | | |
| Carbon black | (parts by weight) | | | | | | | |
| Carnauba wax | (parts by weight) | | | | | | | |
| Soldering crack test (number of cracked samples/total number) | Moisture absorption 48 hr | 0/16 | 16/16 | 2/16 | 3/16 | 2/16 | 6/16 | 10/16 |
| | Moisture absorption 72 hr | 0/16 | 16/16 | 6/16 | 8/16 | 7/16 | 12/16 | 14/16 |
| Average life in soldering-moisture resistance test (time to 50% poor opening of circuit) | (hr) | 300< | 80 | 200 | 160 | 200 | 120 | 120 |
| Curability test | Barcol hardness 935 | 50–60 | 80–90 | 75–85 | 75–85 | 70–80 | 70–80 | 80–90 |

EXAMPLE V-1

| | |
|---|---|
| Tris (hydroxyalkylphenyl)methane triglycidyl ether type epoxy resin represented by the formula (Ic) | 15 parts by weight |

-continued

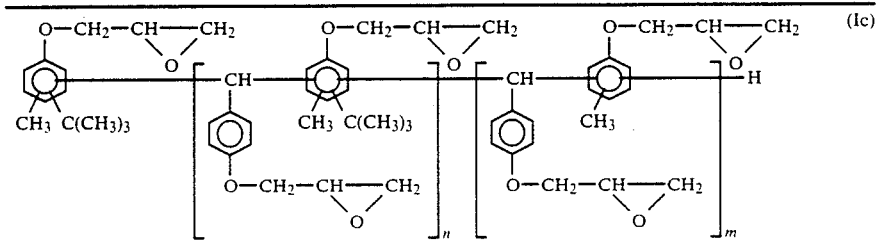

[the above resin is a mixture of two formula (Ic) resins (a resin of n = 2 and m = 1 and a resin of n = 5 and m = 2) wherein the ratio of the former and latter resins is 8:2]

| | |
|---|---|
| Orthocresol novolac epoxy resin | 5 parts by weight |
| Phenolic novolac resin | 10 parts by weight |
| Fused silica powder | 68.8 parts by weight |
| Triphenylphosphine | 0.2 part by weight |
| Carbon black | 0.5 part by weight |
| Carnauba wax | 0.5 part by weight |

The above materials were mixed at normal temperature by means of a mixer. The mixture was kneaded at 70-100° C. by means of twin rolls. AFter cooling, the mixture was ground to obtain a molding material.

From the molding material were prepared sealed moldings for test purpose in the same manner as in Example I-1. The moldings were subjected to the same soldering crack test and soldering-moisture resistance test as in Example I-1. In these tests, the solder bath temperature was 240° C.

The test results are shown in Table V.

EXAMPLES V-2 and V-3

Compounding was effected according to the recipes of Table V and the subsequent kneading and grinding were effected in the same manner as in Example V-1 to obtain molding materials. From the molding materials were prepared sealed moldings for test purpose in the same manner as in Example I-1. The moldings were subjected to the same soldering crack test and solderingmoisture resistance test as in Example V-1. The test results are shown in Table V.

COMPARATIVE EXAMPLES V-1 and V-2

Compounding was effected according to the recipes of Table V and the subsequent kneading and grinding were effected in the same manner as in Example V-1 to obtain molding materials. From the molding materials were prepared sealed moldings for test purpose in the same manner as in Example I-1. The moldings were subjected to the same soldering crack test and solderingmoisture resistance test as in Example V-1. The test results are shown in Table V.

TABLE V

| | | Example | | | Comparative Example | |
|---|---|---|---|---|---|---|
| | | V-1 | V-2 | V-3 | V-1 | V-2 |
| Tris(hydroxyalkylphenyl)methane triglycidyl ether type epoxy resin (Ic) | (parts by weight) | 15 | 20 | 10 | 5 | 0 |
| Orthocresol novolac epoxy resin | (parts by weight) | 5 | 0 | 10 | 15 | 20 |
| Fused silica powder | (parts by weight) | | | 68.8 | | |
| Phenolic novolac resin | (parts by weight) | | | 10 | | |
| Triphenylphosphine | (parts by weight) | | | 0.2 | | |
| Carbon black | (parts by weight) | | | 0.5 | | |
| Carnauba wax | (parts by weight) | | | 0.5 | | |
| Soldering crack test (number of cracked samples/total number) | Moisture absorption 48 hr | 0/16 | 0/16 | 0/16 | 5/16 | 16/16 |
| | Moisture absorption 72 hr | 0/16 | 0/16 | 2/16 | 10/16 | 16/16 |
| Average life in soldering-moisture resistance test | (hr) | 300< | 300< | 300< | 200 | 150 |

EXAMPLE VI-1

Tris(hydroxyalkylphenyl)methane triglycidyl ether type epoxy resin represented by the formula (Ib)  15 parts by weight

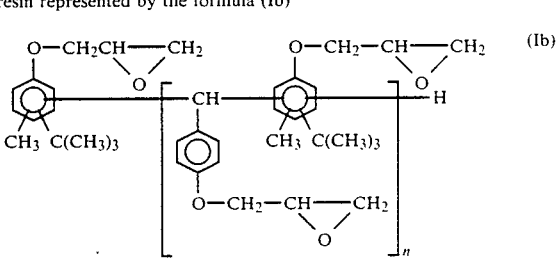

[the above resin is a mixture of three formula (Ib) resins (n = 1, 2 and 3) wherein the mixing ratio is 8 (n = 1):1 (n = 2):1 (n = 3)]

| | |
|---|---|
| Orthocresol novolac epoxy resin | 5 parts by weight |
| Phenolic novolac resin | 10 parts by weight |
| Fused silica powder | 68.7 parts by weight |
| Triphenylphosphine | 0.3 part by weight |
| Carbon black | 0.5 part by weight |
| Carnauba wax | 0.5 part by weight |

The above materials were mixed at normal temperature by means of a mixer. The mixture was kneaded at 70-100° C. by means of twin rolls. After cooling, the mixture was ground to obtain a molding material.

From the molding material were prepared sealed molding for test purpose in the same manner as in Example I-1. The moldings were subjected to the same soldering crack test and soldering-moisture resistance test as in Example V-1.

The test results are shown in Table VI.

EXAMPLES VI-2 and VI-3

Compounding was effected according to the recipes of Table VI and the subsequent kneading and grinding were effected in the same manner as in Example VI-1 to obtain molding materials. From the molding materials were prepared sealed moldings for test purpose in the same manner as in Example I-1. The moldings were subjected to the soldering crack test and soldering-moisture resistance test as in Example V-1. The results are shown in Table VI.

COMPARATIVE EXAMPLES VI-1 and VI-2

Compounding was effected according to the recipes of Table VI and the subsequent kneading and grinding were effected in the same manner as in Example VI-1 to obtain molding materials. From the molding materials were prepared sealed moldings for test purpose in the same manner as in Example I-1. The moldings were subjected to the same soldering crack test and soldering-moisture resistance test as in Example V-1. The test results are shown in Table VI.

TABLE VI

|  |  | Example | | | Comparative Example | |
|---|---|---|---|---|---|---|
|  |  | VI-1 | VI-2 | VI-3 | VI-1 | VI-2 |
| Tris(hydroxyalkylphenyl)methane triglycidyl ether type epoxy resin (Ib) | (parts by weight) | 15 | 20 | 10 | 5 | 0 |
| Orthocresol novolac epoxy resin | (parts by weight) | 5 | 0 | 10 | 15 | 20 |
| Fused silica powder | (parts by weight) |  |  | 68.7 |  |  |
| Phenolic novolac resin | (parts by weight) |  |  | 10 |  |  |
| Triphenylphosphine | (parts by weight) |  |  | 0.3 |  |  |
| Carbon black | (parts by weight) |  |  | 0.5 |  |  |
| Carnauba wax | (parts by weight) |  |  | 0.5 |  |  |
| Soldering crack test (number of cracked samples/total number) | Moisture absorption 48 hr | 0/16 | 0/16 | 0/16 | 5/16 | 16/16 |
|  | Moisture absorption 72 hr | 0/16 | 0/16 | 2/16 | 10/16 | 16/16 |
| Average life in soldering-moisture resistance test | (hr) | 300< | 300< | 300< | 200 | 150 |

EXAMPLE VII-1

| | |
|---|---|
| Tris(hydroxyalkylphenyl)methane triglycidyl ether type epoxy resin represented by the formula (Ic) | 15 parts by weight |

(Ic)

[the above resin is a mixture of two formula (Ic) resins (a resin of n = 2 and m = 1 and a resin of n = 5 and m = 2) wherein the mixing ratio of the former and latter resins is 8:2]

| | |
|---|---|
| Orthocresol novolac epoxy resin | 5 parts by weight |
| Paraxylene-moldified phenolic resin represented by the formula (IIa) | 6 parts by weight |

(IIa)

[the above resin is a mixture of three formula (IIa) resins (n = 0, 1 and 2) wherein the mixing ratio is 2 (n = 0):5 (n = 1):3 (n = 2)]

| | |
|---|---|
| Phenolic novolac resin | 4 parts by weight |
| Fused silica powder | 68.8 parts by weight |
| Triphenylphosphine | 0.2 part by weight |
| Carbon black | 0.5 part by weight |
| Carnauba wax | 0.5 part by weight |

The above materials were mixed at normal temperature by means of a mixer. The mixture was kneaded at 70-100° C. by means of twin rolls. After cooling, the mixture was ground to obtain a molding material.

From the molding material were prepared sealed moldings for test purpose in the same manner as in Example I-1. The moldings were subjected to the same soldering crack test and soldering-moisture resistance test as in Example I-1. In these tests, the solder both temperature was 260° C.

The results ar shown in Table VII.

EXAMPLES VII-2 to VII-5

Compounding was effected according to the recipes of Table VII and the subsequent kneading and grinding were effected in the same manner as in Example VII-1 to obtain molding materials. From the molding materials were prepared sealed moldings for test purpose in the same manner as in Example I-1. The moldings were subjected to the same soldering crack test and solderingmoisture resistance test as in Example VII-1. The test results are shown in Table VII.

COMPARATIVE EXAMPLES VII-1 to VII-6

Compounding was effected according to the reCipes of Table VII and the subsequent kneading and grinding were effected in the same manner as in Example VII-1 to obtain molding materials. From the molding materials were prepared sealed moldings for test purpose in the same manner as in Example I-1. The moldings were subjected to the same soldering crack test and solderingmoisture resistance test as in Example VII-1. The test results are shown in Table VII.

TABLE VII

| | | Example | | | | |
|---|---|---|---|---|---|---|
| | | VII-1 | VII-2 | VII-3 | VII-4 | VII-5 |
| Tris(hydroxyphenyl)methane triglycidyl ether type epoxy resin (Ic) | (parts by weight) | 15 | 20 | 20 | 10 | 10 |
| Orthocresol novolac epoxy resin | (parts by weight) | 5 | 0 | 0 | 10 | 10 |
| Paraxylene-modified phenolic resin (IIa) | (parts by weight) | 6 | 10 | 3 | 10 | 3 |
| Phenolic novolac resin | (parts by weight) | 4 | 0 | 7 | 0 | 7 |
| Fused silica powder | (parts by weight) | | | 68.2 | | |
| Triphenylphosphine | (parts by weight) | | | 0.2 | | |
| Carbon black | (parts by weight) | | | 0.5 | | |
| Carnauba wax | (parts by weight) | | | 0.5 | | |
| Soldering crack test (number of cracked samples/total number) | Moisture absorption 48 hr | 0/16 | 0/16 | 0/16 | 0/16 | 0/16 |
| | Moisture absorption 72 hr | 0/16 | 0/16 | 0/16 | 1/16 | 2/16 |
| Average life in soldering-moisture resistance test | (hr) | 300< | 300< | 300< | 300< | 300< |

| | | Comparative Example | | | | | |
|---|---|---|---|---|---|---|---|
| | | VII-1 | VII-2 | VII-3 | VII-4 | VII-5 | VII-6 |
| Tris(hydroxyphenyl)methane triglycidyl ether type epoxy resin (Ic) | (parts by weight) | 20 | 5 | 5 | 15 | 0 | 0 |
| Orthocresol novolac epoxy resin | (parts by weight) | 0 | 15 | 15 | 5 | 20 | 20 |
| Paraxylene-modified phenolic resin (IIa) | (parts by weight) | 1 | 10 | 1 | 0 | 6 | 0 |
| Phenolic novolac resin | (parts by weight) | 9 | 0 | 9 | 10 | 4 | 10 |
| Fused silica powder | (parts by weight) | | | | | | |
| Triphenylphosphine | (parts by weight) | | | | | | |
| Carbon black | (parts by weight) | | | | | | |
| Carnauba wax | (parts by weight) | | | | | | |
| Soldering crack test (number of cracked samples/total number) | Moisture absorption 48 hr | 0/16 | 3/16 | 5/16 | 2/16 | 10/16 | 16/16 |
| | Moisture absorption 72 hr | 5/16 | 10/16 | 12/16 | 8/16 | 16/16 | 16/16 |
| Average life in soldering-moisture resistance test | (hr) | 300 | 300 | 200 | 250 | 200 | 150 |

EXAMPLE VIII-1

| | |
|---|---|
| Epoxy resin represented by the formula (Ic) | 15 parts by weight |

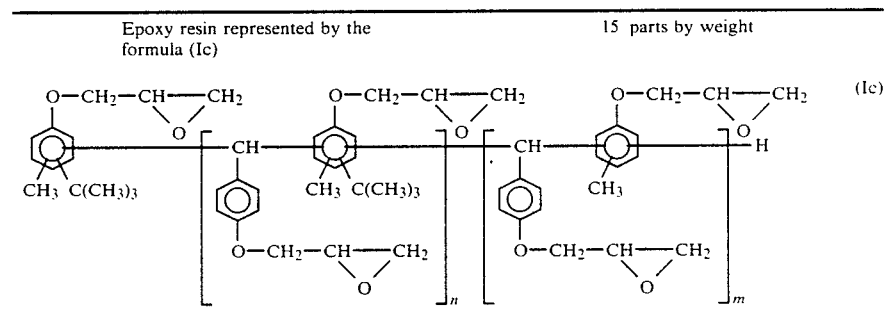

[the above resin is a mixture of two formula (Ic) resins (a resin of n = 2 and m = 1 and a resin of n = 5 and m = 2) wherein the mixing ratio of the former and latter resins is 8:2]

-continued

| | |
|---|---|
| Orthocresol novolac epoxy resin | 5 parts by weight |
| Phenolic resin represented by the formula (IIIa) | 7 parts by weight |

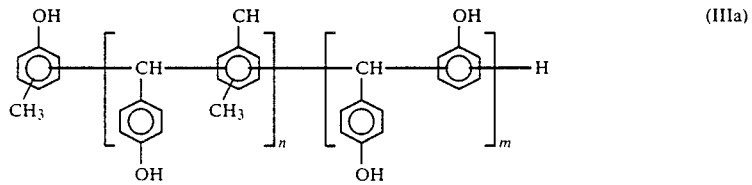

[the above resin is a mixture of two formula (IIIa) resins (a resin of n = 2 and m = 1 and a resin of n = 5 and m = 2) wherein the ratio of the former and latter resins is 8:2]

| | |
|---|---|
| Phenolic novolac resin | 3 parts by weight |
| Fused silica powder | 68.8 parts by weight |
| Triphenylphosphine | 0.2 parts by weight |
| Carbon black | 0.5 part by weight |
| Carnauba wax | 0.5 part by weight |

The above materials were mixed at normal temperature by means of a mixer. The mixture was kneaded at 70–100° C. by means of twin rolls. After cooling, the mixture was ground to obtain a molding material.

From the molding material were prepared sealed moldings for test purpose in the same manner as in Example I-1. The moldings were subjected to the same soldering crack test and soldering-moisture resistance test as in Example I-1.

The results are shown in Table VIII.

EXAMPLES VIII-2 to VIII-5

Compounding was effected according to the recipes of Table VIII and the subsequent kneading and grinding were effected in the same manner as in Example VIII-1 to obtain molding materials. From the molding materials were prepared sealed moldings for test purpose in the same manner as in Example I-1. The moldings were subjected to the same soldering crack test and solderingmoisture resistance test as in Example I-1. The test results are shown in Table VIII.

COMPARATIVE EXAMPLES VIII-1 to VIII-6

Compounding was effected according to the recipes of Table VIII and the subsequent kneading and grinding were effected in the same manner as in Example VIII-1 to obtain molding materials. From the molding materials were prepared sealed moldings for test purpose in the same manner as in Example I-1. The moldings were subjected to the same soldering crack test and solderingmoisture resistance test as in Example I-1. The test results are shown in Table VIII.

TABLE VIII

| | | Example | | | | |
|---|---|---|---|---|---|---|
| | | VIII-1 | VIII-2 | VIII-3 | VIII-4 | VIII-5 |
| Polyfunctional epoxy resin (Ic) | (parts by weight) | 15 | 20 | 20 | 10 | 10 |
| Orthocresol novolac epoxy resin | (parts by weight) | 5 | 0 | 0 | 10 | 10 |
| Polyfunctional phenolic resin (IIIa) | (parts by weight) | 7 | 10 | 5 | 10 | 5 |
| Phenolic novolac resin | (parts by weight) | 3 | 0 | 5 | 0 | 5 |
| Fused silica powder | (parts by weight) | | | 68.8 | | |
| Triphenylphosphine | (parts by weight) | | | 0.2 | | |
| Carbon black | (parts by weight) | | | 0.5 | | |
| Carnauba wax | (parts by weight) | | | 0.5 | | |
| Soldering crack test (number of cracked samples/total number) | Moisture absorption 48 hr | 0/16 | 0/16 | 0/16 | 0/16 | 0/16 |
| | Moisture absorption 72 hr | 0/16 | 0/16 | 0/16 | 1/16 | 2/16 |
| Average life in soldering-moisture resistance test | (hr) | 300< | 300< | 300< | 300< | 300< |

| | | Comparative Example | | | | | |
|---|---|---|---|---|---|---|---|
| | | VIII-1 | VIII-2 | VIII-3 | VIII-4 | VIII-5 | VIII-6 |
| Polyfunctional epoxy resin (Ic) | (parts by weight) | 20 | 5 | 5 | 15 | 0 | 0 |
| Orthocresol novolac epoxy resin | (parts by weight) | 0 | 15 | 15 | 5 | 20 | 20 |
| Polyfunctional phenolic resin (IIIa) | (parts by weight) | 3 | 10 | 3 | 0 | 7 | 0 |
| Phenolic novolac resin | (parts by weight) | 7 | 0 | 7 | 10 | 3 | 10 |
| Fused silica powder | (parts by weight) | | | | | | |
| Triphenylphosphine | (parts by weight) | | | | | | |
| Carbon black | (parts by weight) | | | | | | |
| Carnauba wax | (parts by weight) | | | | | | |
| Soldering crack test (number of cracked samples/total number) | Moisture absorption 48 hr | 0/16 | 3/16 | 5/16 | 2/16 | 10/16 | 16/16 |
| | Moisture absorption 72 hr | 5/16 | 10/16 | 12/16 | 8/16 | 16/16 | 16/16 |
| Average life in soldering-moisture resistance test | (hr) | 300 | 300 | 200 | 250 | 200 | 150 |

| | |
|---|---|
| Tris(hydroxyalkylphenyl)methane triglycidyl ether type epoxy resin represented by the formula (Id) | 12 parts by weight |

$$\begin{array}{c}\text{(Id)}\end{array}$$

[Structure of formula (Id): Tris(hydroxyalkylphenyl)methane triglycidyl ether type epoxy resin with repeating units n and m, containing phenyl rings with O—CH$_2$—CH—CH$_2$ (epoxide) groups and CH$_3$, C(CH$_3$)$_3$ substituents]

| | |
|---|---|
| [the above resin is a mixture of two formula (Id) resins (a resin of n = 2 and m = 1 and a resin of n = 1 and m = wherein the mixing ratio of the former and latter resins is 8:2] | |
| Orthocresol novolac epoxy resin | 8 parts by weight |
| Dicyclopentadiene-modified phenolic resin represented by the formula (IVa) | 6 parts by weight |

[Structure of formula (IVa): Dicyclopentadiene-modified phenolic resin with OH-substituted phenyl rings linked by dicyclopentadiene units, with repeating unit n] (IVa)

| | |
|---|---|
| [the above resin is a mixture of three formula (IVa) resins (n = 1, 3 and 4) wherein the mixing ratio is 2 (n = 1):6 (n = 3):2 (n = 4] | |
| Phenolic novolac resin | 4 parts by weight |
| Fused silica powder | 68.8 parts by weight |
| Triphenylphosphine | 0.2 part by weight |
| Carbon black | 0.5 part by weight |
| Carnauba wax | 0.5 part by weight |
| (The compounding ratio of the epoxy resin and the phenolic resin was such that the number of epoxy groups of the epoxy resin became 1.2 per hydroxyl group of the phenolic resin.) | |

The above materials were mixed at normal temperature by means of a mixer. The mixture was kneaded at 70–100° C. by means of twin rolls. After cooling, the mixture was ground to obtain a molding material.

From the molding material were prepared sealed moldings for test purpose in the same manner as in Example I-1. The moldings were subjected to the same soldering crack test and soldering-moisture resistance test as in Example I-1.

The test results are shown in Table IX.

EXAMPLES IX-2 to IX-5

Compounding was effected according to the recipes of Table IX and the subsequent kneading and grinding were effected in the same manner as in Example I-1 to obtain molding materials. From these molding materials were prepared sealed moldings for test purpose in the same manner as in Example I-1. The moldings were subjected to the same soldering crack test and soldering-moisture resistance test as in Example I-1. The results are shown in Table IX.

COMPARATIVE EXAMPLES IX-1 to IX-5

Compounding was effected according to the recipes of Table IX and the subsequent kneading and grinding were effected in the same manner as in Example IX-1 to obtain molding materials. From the molding materials were prepared sealed moldings for test purpose in the same manner as in Example I-1. The moldings were subjected to the same soldering crack test and soldering-moisture resistance test as in Example I-1. The results are shown in Table IX.

TABLE IX

| | | Example | | | | |
|---|---|---|---|---|---|---|
| | | IX-1 | IX-2 | IX-3 | IX-4 | IX-5 |
| Tris(hydroxyphenyl)methane triglycidyl ether type epoxy resin (Id) | (parts by weight) | 12 | 20 | 14 | 20 | 10 |
| Orthocresol novolac epoxy resin | (parts by weight) | 8 | 0 | 6 | 0 | 10 |
| Dicyclopentadiene-modified phenolic resin (IVa) | (parts by weight) | 6 | 10 | 7 | 6 | 10 |
| Phenolic novolac resin | (parts by weight) | 4 | 0 | 3 | 4 | 0 |
| Fused silica powder | (parts by weight) | | | 68.8 | | |
| Triphenylphosphine | (parts by weight) | | | 0.2 | | |
| Carbon black | (parts by weight) | | | 0.5 | | |
| Carnauba wax | (parts by weight) | | | 0.5 | | |
| Soldering crack test (number of cracked samples/total number) | Moisture absorption 48 hr | 0/16 | 0/16 | 0/16 | 0/16 | 0/16 |
| | Moisture absorp- | 0/16 | 0/16 | 0/16 | 1/16 | 2/16 |

TABLE IX-continued

|  |  | IX-1 | IX-2 | IX-3 | IX-4 | IX-5 |
|---|---|---|---|---|---|---|
| Average life in soldering-moisture resistance test (time of 50% poor opening of circuit) | tion 72 hr (hr) | 300< | 300< | 300< | 300< | 300< |

|  |  | Comparative Example ||||| 
|---|---|---|---|---|---|---|
|  |  | IX-1 | IX-2 | IX-3 | IX-4 | IX-5 |
| Tris(hydroxyphenyl)methane triglycidyl ether type epoxy resin (Id) | (parts by weight) | 0 | 8 | 12 | 20 | 0 |
| Orthocresol novolac epoxy resin | (parts by weight) | 20 | 12 | 8 | 0 | 20 |
| Dicyclopentadiene-modified phenolic resin (IVa) | (parts by weight) | 0 | 6 | 4 | 0 | 10 |
| Phenolic novolac resin | (parts by weight) | 10 | 4 | 6 | 10 | 0 |
| Fused silica powder | (parts by weight) |  |  |  |  |  |
| Triphenylphosphine | (parts by weight) |  |  |  |  |  |
| Carbon black | (parts by weight) |  |  |  |  |  |
| Carnauba wax | (parts by weight) |  |  |  |  |  |
| Soldering crack test (number of cracked samples/total number) | Moisture absorption 48 hr | 16/16 | 2/16 | 3/16 | 5/16 | 6/16 |
|  | Moisture absorption 72 hr | 16/16 | 12/16 | 10/16 | 16/16 | 16/16 |
| Average life in soldering-moisture resistance test (time of 50% poor opening of circuit) | (hr) | 80 | 160 | 200 | 100 | 100 |

What is claimed is:

1. An epoxy resin composition for semiconductor sealing which comprises, as essential components, (A) an epoxy resin comprising 50-100% by weight, based on total epoxy resin amount, of a polyfunctional epoxy resin represented by the formula (I)

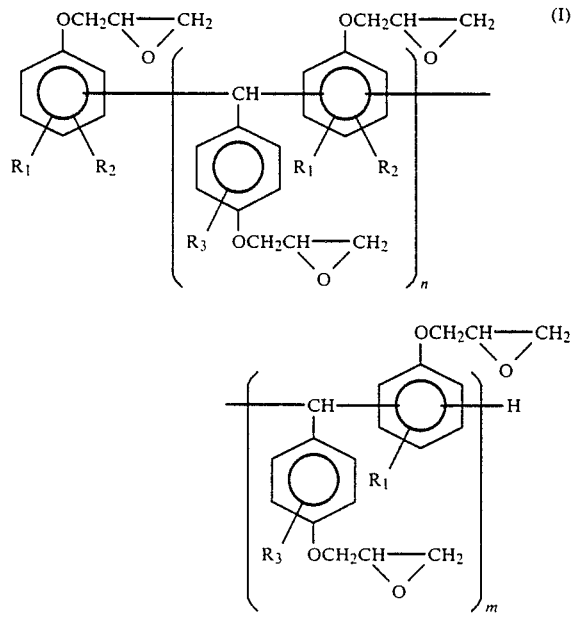

wherein n and m are each an integer of 0 or more, $n+m=1-10$, the ratio of $(n+1) : m = 3:1$, $R_1$ is methyl, $R_2$ is tert-butyl, and $R_3$ is hydrogen, (B) a phenolic resin curing agent comprising 30—100% by weight, based on total amount of phenolic resin curing agent, of a paraxylene-modified phenolic resin curing agent represented by the formula (II)

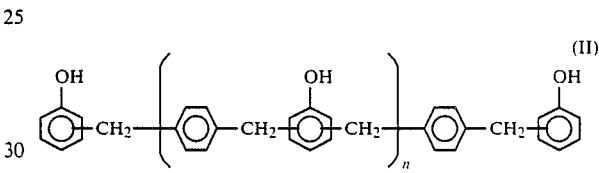

wherein n is an integer of 0-5, (C) a silica filler, and (D) a curing accelerator.

2. An epoxy resin composition for semiconductor sealing which comprises, as essential components, (A) an epoxy resin comprising 50-100% by weight, based on total epoxy resin amount, of a polyfunctional epoxy resin represented by the formula (I)

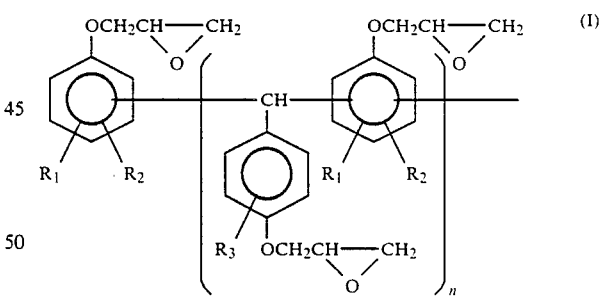

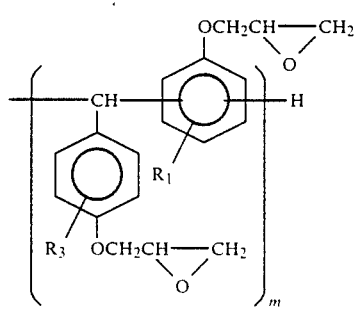

wherein n and m are each an integer of 0 or more, $n+m=1-10$, the ratio of $(n+1) : m = 3:1$, $R_1$ is methyl, $R_2$ is tert-butyl, and $R_3$ is hydrogen, (B) a phenolic resin curing agent comprising 50-100% by weight, based on total amount of phenolic resin curing agent, of a tris(hydroxyphenyl)methane phenolic resin curing agent represented by the formula (III)

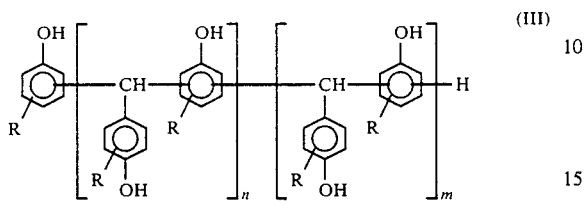

wherein n and m are each an integer of 0-10, n+m=1-10, and R is selected from hydrogen atom, methyl group, ethyl group, propyl group, butyl group, tert-butyl group, or a combination thereof, (C) a silica filler, and
(D) a curing accelerator.

3. An epoxy resin composition for semiconductor sealing which comprises, as essential components, (A) an epoxy resin comprising 50-100% by weight, based on total epoxy resin amount, of a polyfunctional epoxy resin represented by the formula (I)

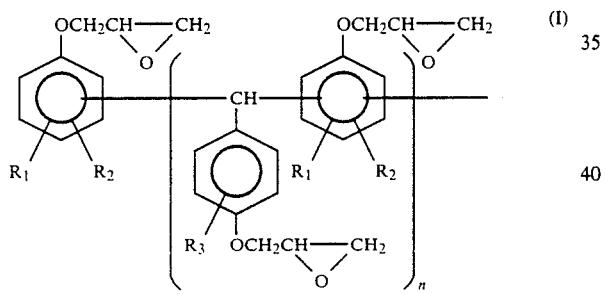

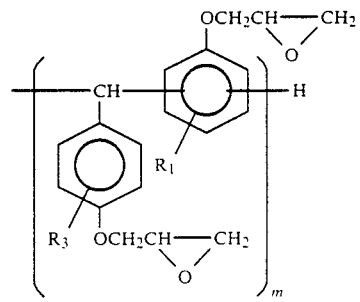

wherein n and m are each an integer of 0 or more, n+m=1-10, (n+1) : m=3:1, $R^1$ is methyl, $R_2$ is tert-butyl, and $R_3$ is hydrogen, (B) a phenolic resin curing agent comprising 50-100% by weight, based on total amount of phenolic resin curing agent, of a dicyclopentadiene-modified phenolic resin curing agent represented by the formula (IV)

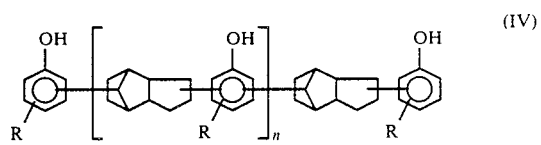

wherein n is an integer of 0-5 and each R is independently an atom or group selected from hydrogen atom, a halogen atom and an alkyl group of 1-4 carbon atoms, (C) a silica filler, and
(D) a curing accelerator.

4. An epoxy resin composition according to claim 1, wherein n=0-2 in the formula (II).

5. An epoxy resin composition according to claim 2, wherein in the formula (III) R means the combination of hydrogen atom and methyl group and (n+1) : m=3:1.

6. An epoxy resin composition according to claim 3, wherein in the formula (IV) R is hydrogen atom and n=1-4.

* * * * *